United States Patent
Anulf et al.

(10) Patent No.: US 10,575,146 B2
(45) Date of Patent: *Feb. 25, 2020

(54) METHOD AND APPARATUS RELATING TO ONLINE CHARGING IN AN IP MULTIMEDIA SUBSYSTEM

(71) Applicant: Telefonaktiebolaget LM Ericsson (publ), Stockholm (SE)

(72) Inventors: Andreas Anulf, Lidingö (SE); Ove Karlsson, Emmaboda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,409

(22) Filed: Sep. 10, 2018

(65) Prior Publication Data

US 2019/0007808 A1 Jan. 3, 2019

Related U.S. Application Data

(63) Continuation of application No. 13/982,330, filed as application No. PCT/EP2012/051383 on Jan. 27, 2012, now Pat. No. 10,080,115.

(Continued)

(30) Foreign Application Priority Data

Dec. 22, 2011 (WO) .................. PCT/EP2011/073886

(51) Int. Cl.
*H04W 4/24* (2018.01)
*H04L 12/14* (2006.01)
*H04M 15/00* (2006.01)

(52) U.S. Cl.
CPC .......... *H04W 4/24* (2013.01); *H04L 12/1467* (2013.01); *H04M 15/64* (2013.01)

(58) Field of Classification Search
CPC ...... H04W 4/24; H04M 15/64; H04L 12/1467
See application file for complete search history.

(56) References Cited

U.S. PATENT DOCUMENTS 6,700,961 B1 * 3/2004 Dacloush .............. H04M 15/00
379/114.16
8,856,860 B2 * 10/2014 Grayson ............... H04L 67/322
726/1

(Continued)

FOREIGN PATENT DOCUMENTS

EP 2061182 A1 5/2009

OTHER PUBLICATIONS

Calhoun, P., et al., "Diameter Base Protocol", Internet Engineering Task Force, Network Working Group, Request for Comments: 3588, Category: Standards Track, Sep. 2003, pp. 1-148.

(Continued)

*Primary Examiner* — Hashim S Bhatti
(74) *Attorney, Agent, or Firm* — Murphy, Bilak & Homiller, PLLC

(57) ABSTRACT

Online charging within an IP Multimedia Subsystem (IMS). A method comprises, at an IMS charging node: (a) receiving a credit control request message from an IMS service network node over a service charging interface provided between the IMS service node and the IMS charging node; (b) determining with reference to one or more triggering conditions that an announcement is to be provided to a user associated with the credit control request message and/or another user; and (c) following such a determination, initiating an announcement service in the IMS service node by sending an announcement request in a credit control answer message over the service charging interface to the IMS service node, the credit control answer message being in response to the credit control request message and the (Continued)

announcement request comprising announcement information relating to the announcement to be provided.

25 Claims, 17 Drawing Sheets

Related U.S. Application Data

(60) Provisional application No. 61/437,965, filed on Jan. 31, 2011, provisional application No. 61/437,833, filed on Jan. 31, 2011.

(56) References Cited

U.S. PATENT DOCUMENTS

| | | | | |
|---|---|---|---|---|
| 2008/0123603 | A1* | 5/2008 | Cai | H04M 7/129 370/338 |
| 2010/0184403 | A1* | 7/2010 | Cai | H04M 15/00 455/406 |
| 2013/0315230 | A1* | 11/2013 | Li | H04L 12/14 370/352 |

OTHER PUBLICATIONS

Hakala, H., et al., "Diameter Credit-Control Application", The Internet Society, Network Working Group, Request for Comments: 4006, Category: Standards Track, Aug. 2005, pp. 1-104.

Kurtansky, P., et al., "State of the Art Prepaid Charging for IP Services", Kurtansky, P. et al. "State of the Art Prepaid Charging for IP Services." Proceedings of the 4th International Conference on Wired/Wireless Internet Communications, Jan. 1, 2006, pp. 143-154, Springer-Verlag Berlin, Heidelberg, Germany.

3GPP, "3rd Generation Partnership Project; Technical Specification Group Services and System Aspects Telecommunication management; Charging management; MultiMedia Telephony (MMTel) charging (Release 9)." 3GPP TS 32.275 V9.5.0, Dec. 2010, 1-92.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 10)." 3GPP TS 24.229 V10.2.0, Dec. 2010, 1-689.

3GPP, "3rd Generation Partnership Project; Technical Specification Group Services and System Aspects; Telecommunication management; Charging management; Charging architecture and principles (Release 10)." 3GPP TS 32.240 V10.0.0, Dec. 2010, 1-44.

3GPP, "3rd Generation Partnership Project; Technical Specification Group Services and System Aspects; Telecommunication management; Charging management; Diameter charging applications (Release 10)." 3GPP TS 32.299 V10.0.0, Dec. 2010, 1-148.

3GPP, "3rd Generation Partnership Project; Technical Specification Group Services and System Aspects; Telecommunication management; Charging management; IP Multimedia Subsystem (IMS) charging (Release 10)", 3GPP TS 32.260 V. 10.2.0, Dec. 2012, 1-122.

\* cited by examiner

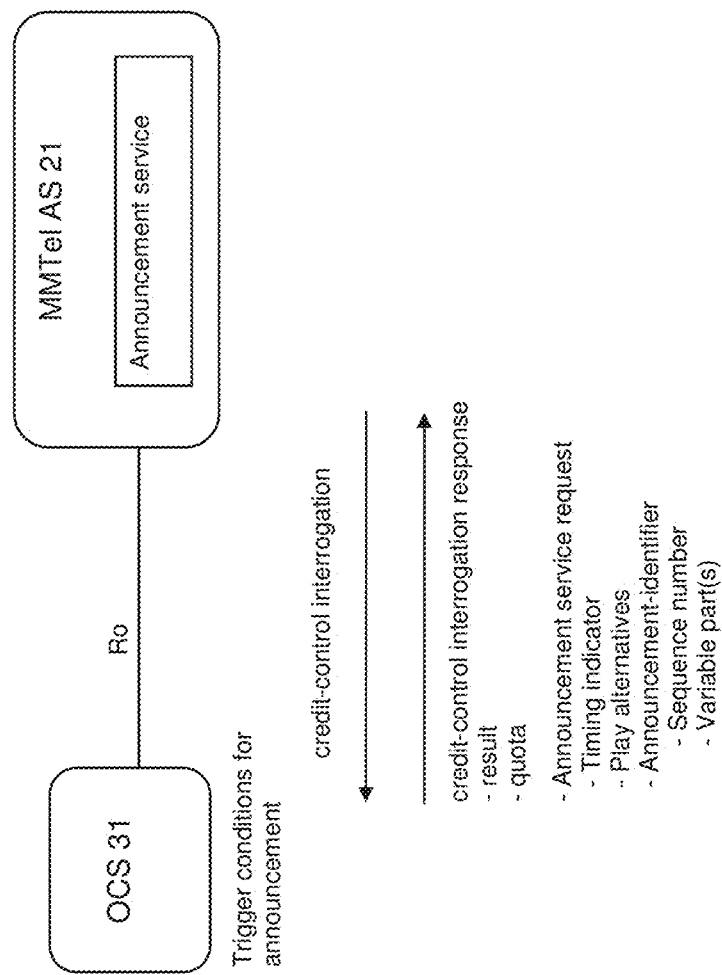

(To Fig. 4b)

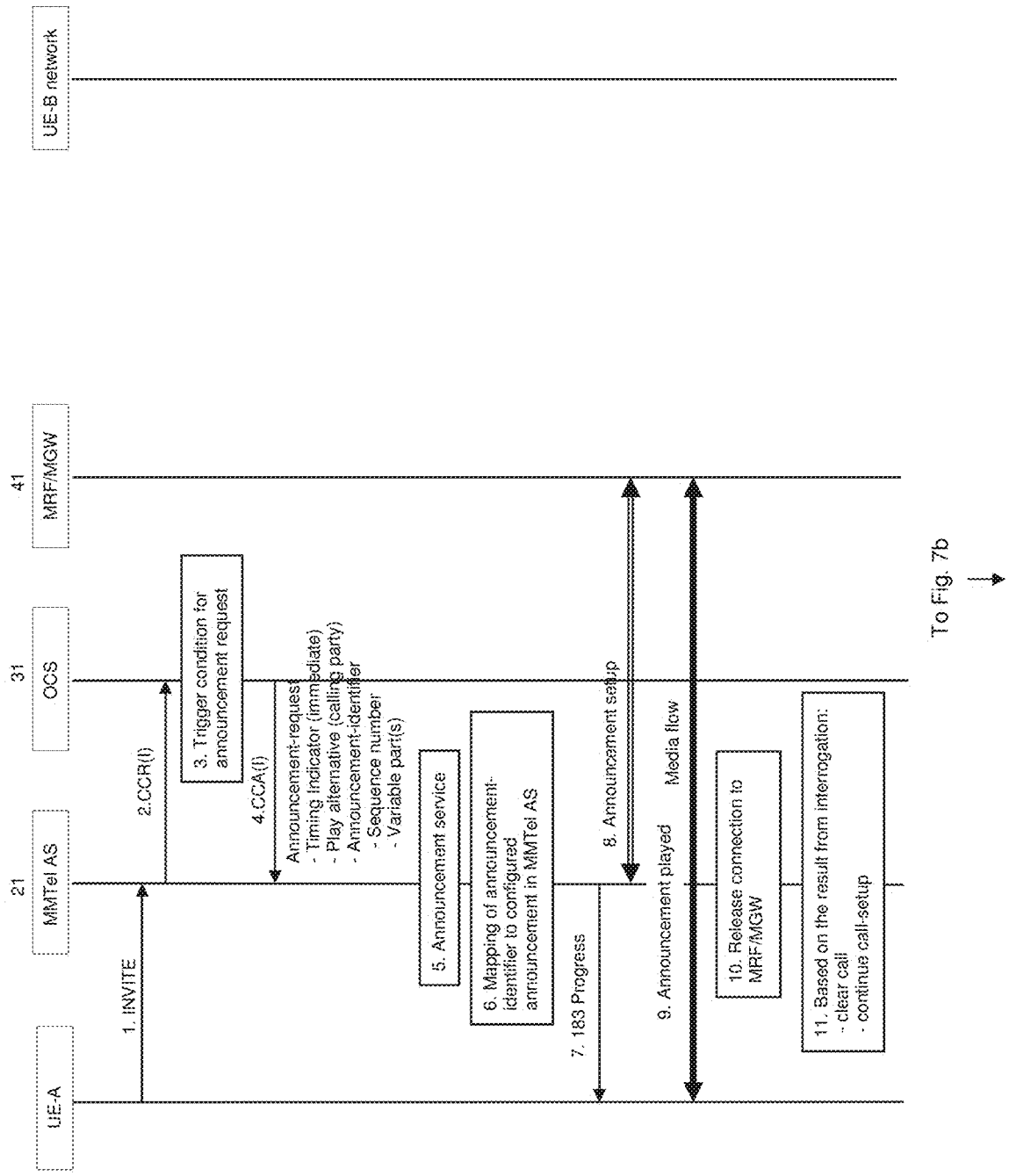

METHOD AND APPARATUS RELATING TO ONLINE CHARGING IN AN IP MULTIMEDIA SUBSYSTEM

TECHNICAL FIELD

The present disclosure relates to a method and apparatus relating to online charging in an IP Multimedia Subsystem.

BACKGROUND

A significant proportion of the mobile users worldwide are prepaid users, having a pre-paid subscription with an operator. For most of the prepaid users online charging is used. With intelligent network (IN) solutions it is common that the Online Charging System (OCS) used has the capability to initiate call announcements towards the prepaid user. These announcements can be generated before call setup (pre-call announcements), during a call or at the end of the call. Pre-call announcements are used for a variety of reasons (e.g. welcome message, account balance information, barring reason). Announcement during a call is often a short warning that the account balance is very low (call cut off warning, often in a form of a tone) and announcement at the end of the call is used when the call has been cut off due to empty account.

For mobile prepaid users in an IP Multimedia Subsystem (IMS) network using a Multimedia Telephony Service (MMTel) application server (AS), the AS can produce some announcements based on information received in attribute value pairs (AVP) from the OCS over an Ro interface (the Ro interface will be described in further detail below). Such announcements can primarily be based on Low-Balance-Indication AVP, Final-Unit-Indication AVP and the received result-code.

Reference should be made to RFC 4006 (Diameter Credit Control), RFC 3588 (Diameter Base Protocol), 3GPP TS 24.229 (Internet Protocol (IP) multimedia call control protocol based on Session Initiation Protocol (SIP) and Session Description Protocol (SDP); Stage 3), 3GPP TS 32.260 (IMS Charging), 3GPP TS 32.240 (Charging architecture and principles), 3GPP TS 32.299 (Telecommunication management; Charging management; Diameter charging applications).

The present applicant has appreciated that there is a need for improved announcement services for mobile prepaid users of a Multimedia Telephony Service (MMTel) in an IP Multimedia Subsystem (IMS) network.

SUMMARY

A method is proposed here which relates to online charging within an IP Multimedia Subsystem, IMS. A credit control request message is received at an IMS charging node from an IMS service network node over a service charging interface provided between the IMS service node and the IMS charging node. It is determined at the IMS charging node, with reference to one or more triggering conditions, that an announcement is to be provided to a user associated with the credit control request message and/or another user. Following such a determination, an announcement service is initiated in the IMS service node by sending from the IMS charging node an announcement request in a credit control answer message over the service charging interface to the IMS service node. The credit control answer message is in response to the credit control request message. The announcement request comprises announcement information relating to the announcement to be provided.

The determining step may be performed in response to receipt of the credit control request message.

The method may comprise, in response to such a determination in the determining step, requesting the IMS service node to send the credit control request message, such that the receiving step is performed following the determining step.

The requesting step may comprise sending a re-authorisation request.

From the point of view of the IMS service node, the above method is seen as follows. The credit control request message is sent to the IMS charging node over the service charging interface provided between the IMS service node and the IMS charging node. Following a determination at the IMS charging node that an announcement is to be provided to a user associated with the credit control request message and/or another user, the announcement request is received in the credit control answer message over the service charging interface. The credit control answer message is in response to the credit control request message. The announcement request comprises the announcement information relating to the announcement to be provided. In response to receipt of the announcement request, the announcement service is activated in the IMS service node. As part of the announcement service, it is arranged for an announcement to be provided based on the announcement information.

The announcement information may comprise at least one of: (i) information concerning when the announcement is to be provided; (ii) information concerning who the announcement is to be provided to; and (iii) information concerning a content of the announcement to be provided.

The information concerning the content of the announcement may comprise an announcement identifier or reference which can be used to look up predetermined content which is to make up at least part of the announcement to be provided.

The method may comprise looking up the predetermined content using the announcement identifier or reference.

The announcement information may comprise an address of a server to be used by the IMS service node for looking up the predetermined content based on the announcement identifier or reference.

The method may comprise communicating with the server to determine the predetermined content for the announcement.

The content of the announcement may comprise at least one of a welcome message, account balance information, barring-related information, account balance information, information relating to a potential or actual call cut off.

The information concerning when the announcement is to be provided may specify whether the announcement is to be provided immediately or whether it is to be delayed for a predetermined time or until a predetermined event.

The announcement may be an account- or a credit-related announcement.

The user associated with the credit control request message may be a calling party. The other user may be a called party. The IMS service node may be involved in enabling a call from the calling party to the called party.

A plurality of announcement requests may be included in the credit control answer message.

A first announcement request of the plurality may relate to a call setup announcement and a second announcement request of the plurality may relate to an announcement at the end of the call.

The credit control answer message may be a Diameter Credit Control Answer, CCA, message.

The credit control request message may be a Diameter Credit Control Request, CCR, message.

The IMS charging node may comprise an Online Charging System, OCS.

The IMS service node may comprise an Application Server.

The service charging interface may be a Diameter Ro interface.

An apparatus is proposed for online charging according to the above-described scheme within an IP Multimedia Subsystem, IMS. The apparatus is for use at an IMS charging node. The apparatus comprises means (or a receiver/processor/circuitry/unit arranged or adapted) for receiving a credit control request message from an IMS service network node over a service charging interface provided between the IMS service node and the IMS charging node. The apparatus comprises means (or a processor/circuitry/unit arranged or adapted) for determining with reference to one or more triggering conditions that an announcement is to be provided to a user associated with the credit control request message and/or another user. The apparatus comprises means (or a transmitter/processor/circuitry/unit arranged or adapted) for, following such a determination, initiating an announcement service in the IMS service node by sending an announcement request in a credit control answer message over the service charging interface to the IMS service node, the credit control answer message being in response to the credit control request message, and the announcement request comprising announcement information relating to the announcement to be provided.

An apparatus is proposed for online charging according to the above-described scheme within an IP Multimedia Subsystem, IMS. The apparatus is for use at an IMS service node. The apparatus comprises: means (or a transmitter/processor/circuitry/unit arranged or adapted) for sending a credit control request message to an IMS charging node over a service charging interface provided between the IMS service node and the IMS charging node. The apparatus comprises means (or a receiver/processor/circuitry/unit arranged or adapted) for, following a determination at the IMS charging node that an announcement is to be provided to a user associated with the credit control request message and/or another user, receiving an announcement request in a credit control answer message over the service charging interface, the credit control answer message being in response to the credit control request message and the announcement request comprising announcement information relating to the announcement to be provided. The apparatus comprises means (or a processor/circuitry/unit arranged or adapted) for, in response to receipt of the announcement request, activating an announcement service in the IMS service node. The apparatus comprises means (or a processor/circuitry/unit arranged or adapted) for, as part of the announcement service, arranging for an announcement to be provided based on the announcement information.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

With previously-considered techniques, the indications provided to the AS do not enable the OCS to provide specific announcements to the user via the AS. For example, the low balance indication only provides general information that the balance is low. An embodiment of the present invention allows for a far more flexible approach, enabling the OCS to control aspects of the announcement service, and what announcements are made. For example, an embodiment of the present invention allows for informing how low the balance is or for how long this low remaining balance will last, and allows for control of what announcement(s) should be made accordingly. The sending of announcement information relating to the announcement to be provided is not suggested in previously-considered approaches. Further, unlike previously-considered techniques, an embodiment of the present invention does not require purpose-specific AVPs but allows for triggering any type of announcement from the OCS towards the AS. Examples may be welcome announcements, campaign information, and so on.

The announcement service at the AS is initiated from the OCS by the sending of the announcement request in the credit control answer message, with the announcement service being carried out (controlled) according to the announcement information carried by the announcement request, in particular in relation to the announcement to be provided.

A flexible announcement according to an embodiment of the present invention is able to provide a user with online charging in IMS with MMTel the same or better announcement service compared with the available services in the mobile networks of today. The solution also gives the operator the flexibility to create an optimized solution for charging announcements based on how the structure for overall announcement handling and announcement servers in the network is build up.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

BRIEF DESCRIPTION OF THE DRAWINGS

FIG. 3 is for use in explaining how an embodiment of the present invention proposes to include additional announcement-related information in the credit control interrogation response message of FIG. 2;

FIGS. 7a and 7b show a signaling diagram illustrating messages exchanged and steps performed in relation to the provision of an announcement service according to an embodiment of the present invention, where an announcement is provided at call setup;

DETAILED DESCRIPTION

An embodiment of the present invention will first be described in general terms, followed by a more detailed description.

An embodiment of the present invention is generally intended to follow the architectural principles of IP Multimedia Sub-system (IMS) and also the principles for online charging at the Ro reference point. In this respect, Ro is a Diameter interface which will now be briefly explained with reference to FIG. 1, in the context of other such interfaces.

Figure 1:
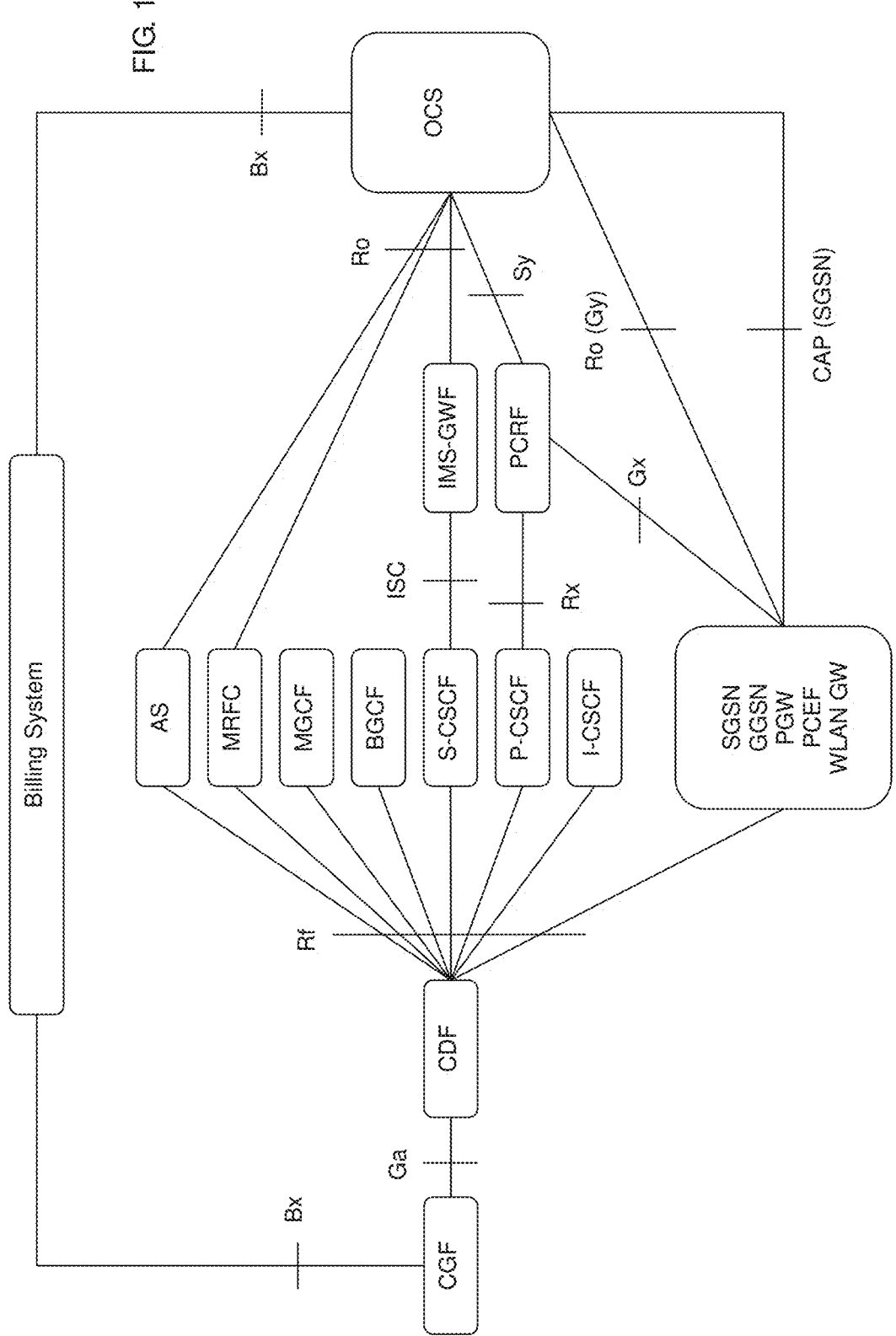
FIG. 1 illustrates by way of background the IMS entities and interfaces involved with online and off line charging systems.

FIG. 1 illustrates the IMS entities and interfaces involved with online and offline charging systems.

Ro is a Diameter interface used by the AS, Media Resource Function Controller (MRFC), Serving Call Session Control Function (S-CSCF) (or more generally nodes in a service network) to exchange online charging information with the OCS.

Gx is a Diameter interface used to exchange policy decisions-related information between the Policy and Charging Enforcement Function (PCEF) and Policy and Charging Rules Function (PCRF).

Gy is a Diameter interface between the OCS and PCEF (or more generally nodes in a core network).

The user is charged for voice and video via the Ro interface and for data via the Gy interface. (Gy is used for flow based charging).

Rx is a Diameter interface used to exchange policy and charging related information between the Proxy Call Session Control Function (P-CSCF) and PCRF.

Rf is a Diameter interface used to exchange offline charging information with the CDF In online charging, network resource usage is granted by the OCS based on the price or the tariff of the requested service and the balance in the subscriber's account. The OCS supports two types of online charging functions: session-based charging function (SBCF) and event-based charging function (EBCF). The SBCF is responsible for network bearer and session-based services such as voice calls, GPRS sessions, or IMS sessions. The OCS is able to control session by allowing or denying a session establishment request after checking the subscriber's account.

IMS supports online charging capabilities through the OCS, where an IMS node or an AS interacts with the OCS in real time to process the user's account and controls the charges related to service usage.

However, the present applicant has appreciated that it is currently not possible to initiate a flexible announcement service from the OCS using the Ro interface, and recognized the desirability of providing a flexible announcement service which can be initiated from the OCS over the Ro (or equivalent) interface.

Figure 2:
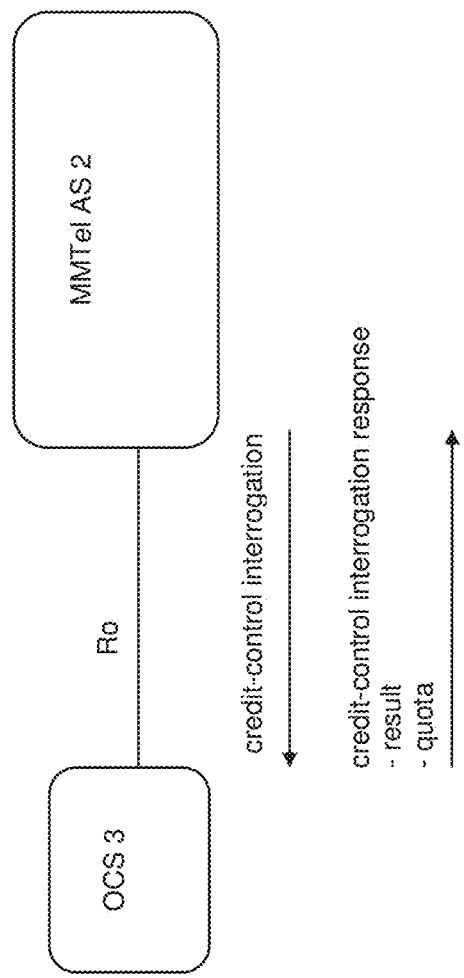
FIG. 2 is for use in explaining the messages passed over an Ro interface between an OCS and a MMTel AS in an online charging scenario.

An embodiment of the present invention is based on existing communication principles between the OCS 3 and an IMS node 2 as shown in FIG. 2. To be able to initiate an announcement from the OCS, as illustrated schematically in FIG. 3, a new "announcement service" is defined in the AS 21, trigger points for the service being defined in the OCS 31 and additions being made to the protocol between the OCS 31 and the AS 21.

When an ordinary credit-control interrogation request is received at the OCS 31, either before the call is set up or during the call, the OCS 31 will do the ordinary rating and processes. The result of this request can be successful (i.e. quota is reserved) or it can be unsuccessful. In addition to this, the OCS 31 will also check for the trigger conditions for initiation of an announcement. If the announcement service is to be requested from the AS 21, the OCS 31 adds this request in the interrogation response to the AS 21, as illustrated in FIG. 3. The OCS 31 includes as part of the announcement service request a timing indicator, a play alternative indicator and an announcement-identifier. The timing indicator is used to inform the announcement service in the MMTel AS 21 when the announcement is to be played, e.g. immediate or delayed. The play alternative indicator is used to inform the announcement service to which party (parties) the announcement shall be played, e.g. calling party or called party or both. The announcement-identifier is used to identify the announcement and can also include a sequence number if more than one announcement is included and also possible variables to be included in variable parts of the announcement.

The announcement service in the AS 21 may consist of:
An announcement selection part
Connection handling between user and announcement equipment The announcement selection part may consist of a mapping function based on the received announcement-identifier from the OCS 31 to the internally defined message in the AS 21.

The AS 21 may set up a connection to announcement equipment and may control that an announcement is sent to the user(s) based on the content of the play alternative indicator. After the message has been delivered to the user, the AS 21 may disconnect the connection to the announcement equipment.

Figure 4A:
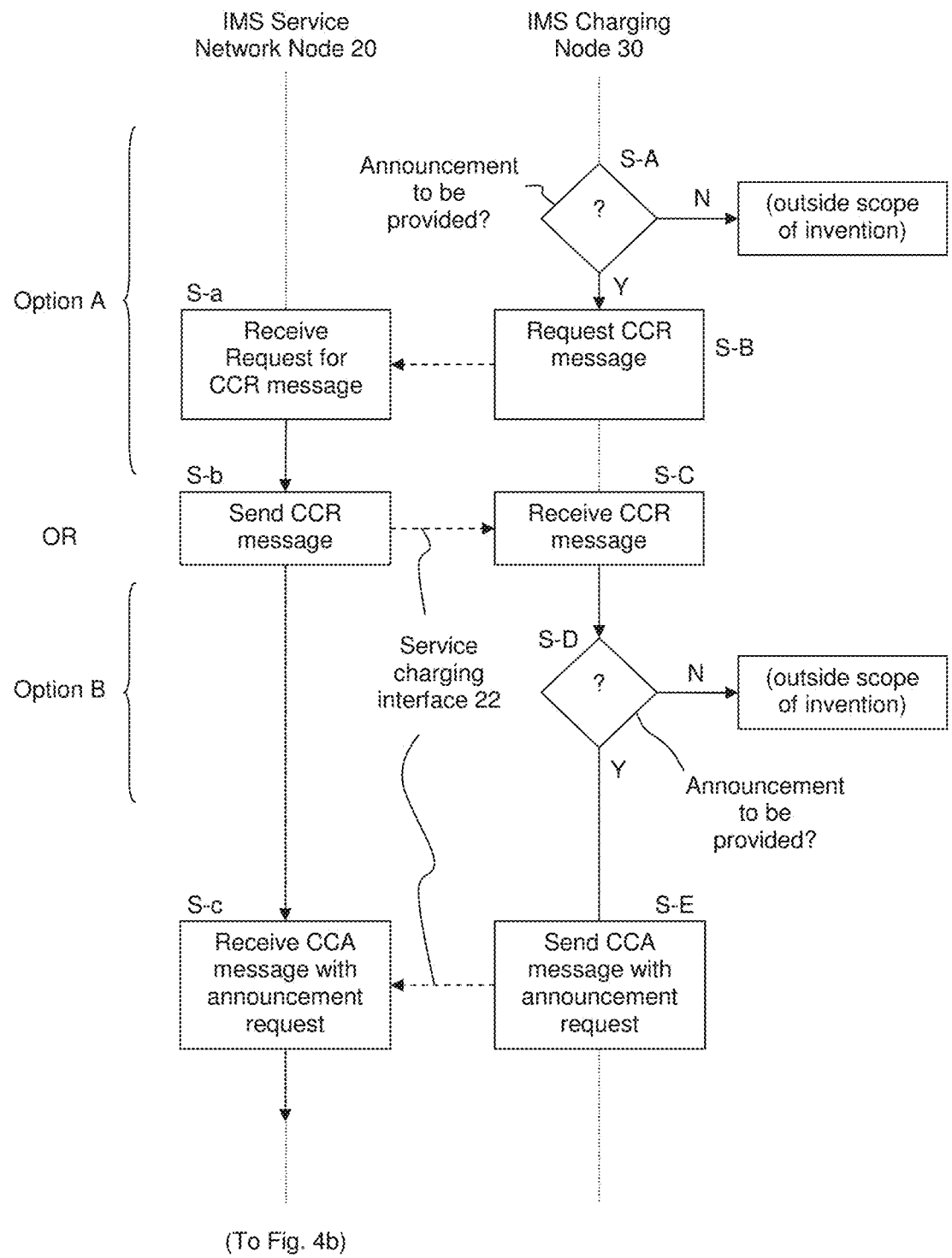
FIGS. 4a and 4b illustrate schematically a method carried out according to an embodiment of the present invention.
Figure 4B:
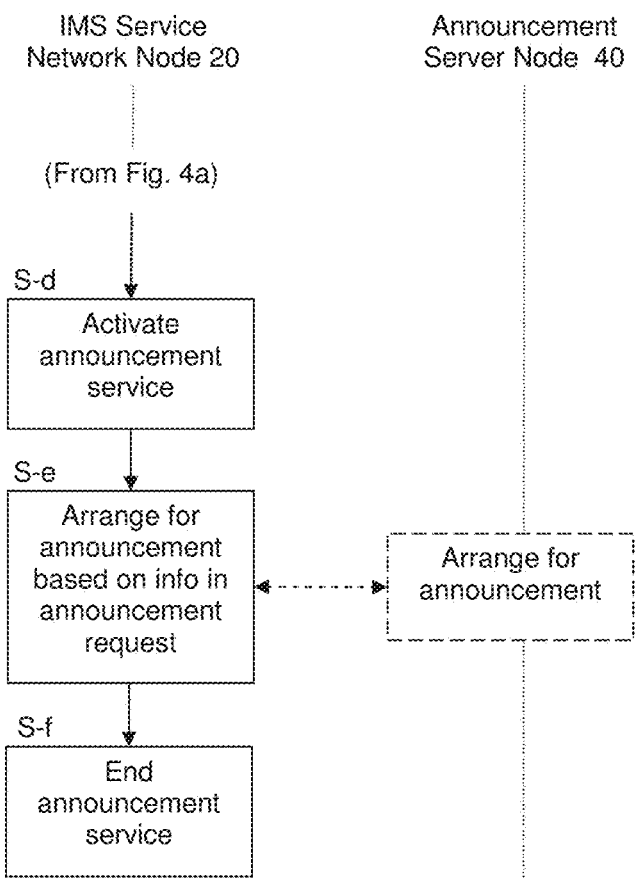

An embodiment is summarized schematically in the flowchart of FIGS. 4a and 4b. These figures show the steps performed by an IMS service network node (e.g. AS) 20, an IMS charging node (e.g. OCS) 30, and an announcement server node (e.g. MRF/MGW) 40. Components of the IMS service network node 20 and IMS charging node 30 are illustrated schematically in FIG. 5.

In step S-b the IMS service network node 20 sends a credit control request message to the IMS charging node 30 over a service charging interface 22 provided between the IMS service network node 20 and the IMS charging node 30. In step S-C, the IMS charging node 30 receives the credit control request message from the IMS service network node 20 over the service charging interface 22.

This credit control request message may either have been requested by the IMS charging node 30 or it may have been sent by the IMS service network node 20 in the normal course of operation of the IMS service network node 20. These two options will now be set out, starting with the first option ("Option A" in FIG. 4a) and followed by the second option ("Option B" in FIG. 4a).

Concerning Option A, in step S-A, the IMS charging node 30 determines with reference to one or more triggering conditions that an announcement is to be provided to a user associated with the credit control request message (e.g. the calling party) and/or another user (e.g. the called party). In response to such a determination in step S-A, in step S-B the IMS charging node 30 sends a request (e.g. a re-authorisation request) to the IMS service network node 20 to send a credit control request message. That request is received by the IMS service network node 20 in step S-a. In response to receipt of the request, the IMS service network node 20 sends the credit control request message to the IMS charging node 30 in step S-b. What happens if the determination in step S-A is that an announcement is not to be provided is beyond the scope of the present invention.

For Option B, steps S-A, S-B and S-a are not performed. Instead, the credit control request message is sent in step S-b in the normal operation of the IMS service network node 20; the reason for the sending of the credit control request message in step S-b is not important, but some of the possible reasons are set out in more detail below. Following receipt of the credit control request message in step S-C, the IMS charging node 30 then performs in step S-D a similar check to that described above with reference to step S-A. In other words, in step S-D the IMS charging node 30 determines with reference to one or more triggering conditions that an announcement is to be provided to a user associated with the credit control request message (e.g. the calling party) and/or another user (e.g. the called party).

In response to such a determination in step S-D, processing passes to step S-E. What happens if the determination in step S-D is that an announcement is not to be provided is beyond the scope of the present invention. Step S-D is not carried out in Option A, such that processing passes from step S-C to S-E in Option A.

Therefore, a determination step is performed by the IMS charging node 30 both in Option A and Option B, with the determination step either coming before or after the credit control request message is received at the IMS charging node 30. In Option B, the determination step is performed in response to receipt of the credit control request message; while in Option A the credit control message is requested in response to such a determination in the determining step, such that the receiving step is performed following the determining step.

After such a determination has been made (a "Yes" in step S-A or step S-D), an announcement service is initiated in the IMS service network node 20 by sending in step S-E an announcement request in a credit control answer message over the service charging interface 22 to the IMS service network node 20. The credit control answer message sent in step S-E is in response to the credit control request message received in step S-C. The announcement request comprises information relating to the announcement to be provided.

The announcement request is received in step S-c by the IMS service network node 20 in the credit control answer message over the service charging interface 22, the credit control answer message received in step S-c being in response to the credit control request message sent earlier in step S-b, and the announcement request comprising the information relating to the announcement to be provided.

In response to receipt of the announcement request, an announcement service is activated in the IMS service network node 20 in step S-d. As part of the announcement service, in step S-e the IMS service network node 20 arranges for an announcement to be provided based on the announcement information in the announcement request. The provision of the announcement may be performed in cooperation with the announcement server 40, more detail of which will be provided below in a specific embodiment. In step S-f the announcement service is terminated at the IMS service network node 20.

Figure 5:
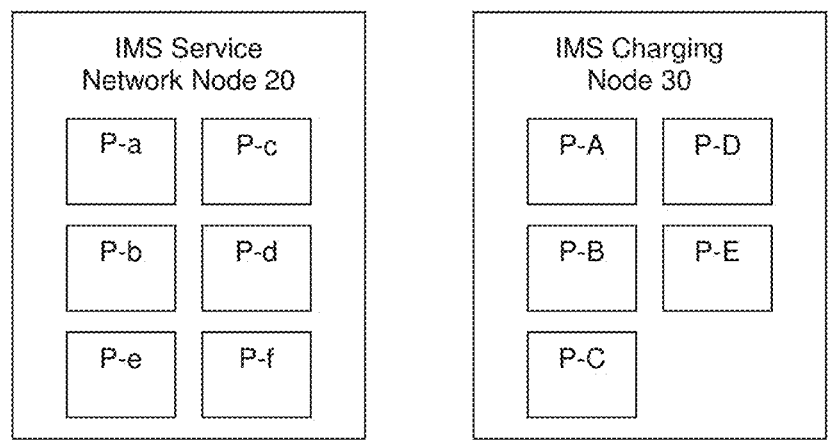
FIG. 5 illustrates schematically apparatus for performing a method according to an embodiment of the present invention.

Components of the IMS service network node 20 and IMS charging node 30 are illustrated schematically in FIG. 5. The IMS service network node 20 comprises components (e.g. processors/receivers/transmitters) P-a to P-f arranged or adapted to perform steps S-a to S-f respectively. The IMS charging node 30 comprises components (e.g. processors/receivers/transmitters) P-A to P-E arranged or adapted to perform steps S-A to S-E respectively.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The disclosure is to be interpreted as covering an operating program by itself, or as a record on a carrier, or as a signal, or in any other form.

Figure 6:
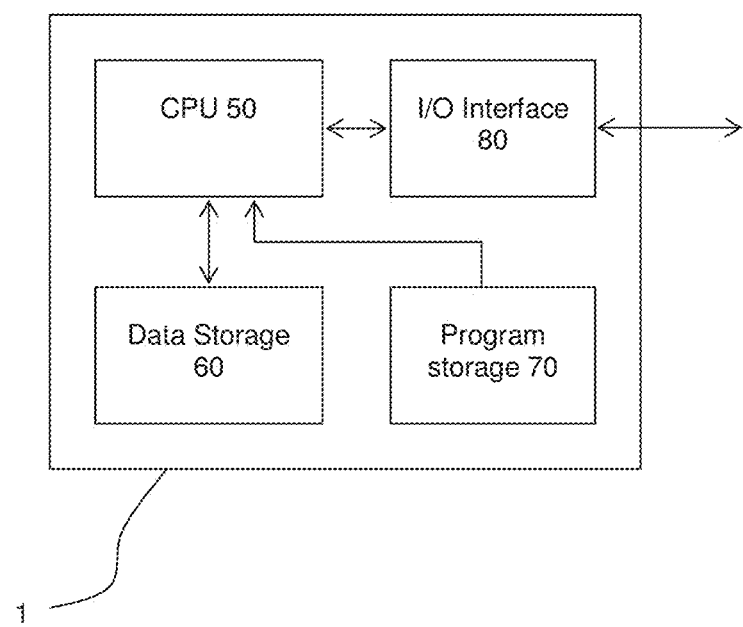
FIG. 6 illustrates schematically a node in which an embodiment of the present invention can be implemented.

FIG. 6 is a schematic illustration of a node 1 in which a technique described herein can be implemented. A computer program for controlling the node 1 to carry out a method as described herein is stored in a program storage 70. Data used during the performance of a method as described herein is stored in a data storage 60. During performance of a method as described herein, program steps are fetched from the program storage 70 and executed by a Central Processing Unit (CPU) 50, retrieving data as required from the data storage 60. Output information resulting from performance of a method as described herein can be stored back in the data storage 60, or sent to an Input/Output (I/O) interface 80, which may comprise a transmitter for transmitting data to other nodes, as required. Likewise, the Input/Output (I/O) interface 80 may comprise a receiver for receiving data from other nodes, for example for use by the CPU 50.

Before a description of more specific embodiments of the present invention, a brief explanation will be provided in relation to the "service charging interface" mentioned above. In this respect, there can be considered to be three different types of charging: content charging, service charging (or communication charging) and bearer charging. There are many different charging models in use—per event, per session, content-based and value-based, to name a few—but they can generally be categorised into these three types or levels: content charging, service charging and bearer charging. Operators have flexibility in setting up the charging in the different levels for all different services, as the charging of many content and data services can and usually will be based on a combination of these levels.

Bearer charging occurs when the users are charged for the actual medium, which carries the service, rather than the service or the content being delivered over it. An example is charging for data bytes when customers use the wireless Internet. When using bearer charging it should be possible to zero-rate the service or content, or both.

Service charging occurs when the users are charged for the enabling service (for example, person-to-person text or picture messaging, streaming and location-based services). When using service charging it should be possible to zero-rate the bearer or content charging, or both.

Content charging occurs when the users are charged for the actual experience or value the users receive from the content and not the underlying technologies. Examples of content and data services that would benefit from this charging level are content-to-person MMS (such as sports clips) and mobile games. When using content charging it should be possible to zero-rate the bearer or service charging, or both.

Content and service charging are generally associated with the service network, while bearer charging is associated with the core network. The Gy interface is used for bearer charging, while the Ro interface is used for content and service charging. For this reason, the term service charging used herein is intended to mean charging associated with the service network, i.e. content charging and/or service charging according to the above description, while the term bearer charging would mean charging associated with the core network.

The Ro interface is therefore an example of a "service charging interface".

More detailed examples embodying the present invention will now be described.

Figure 7B:
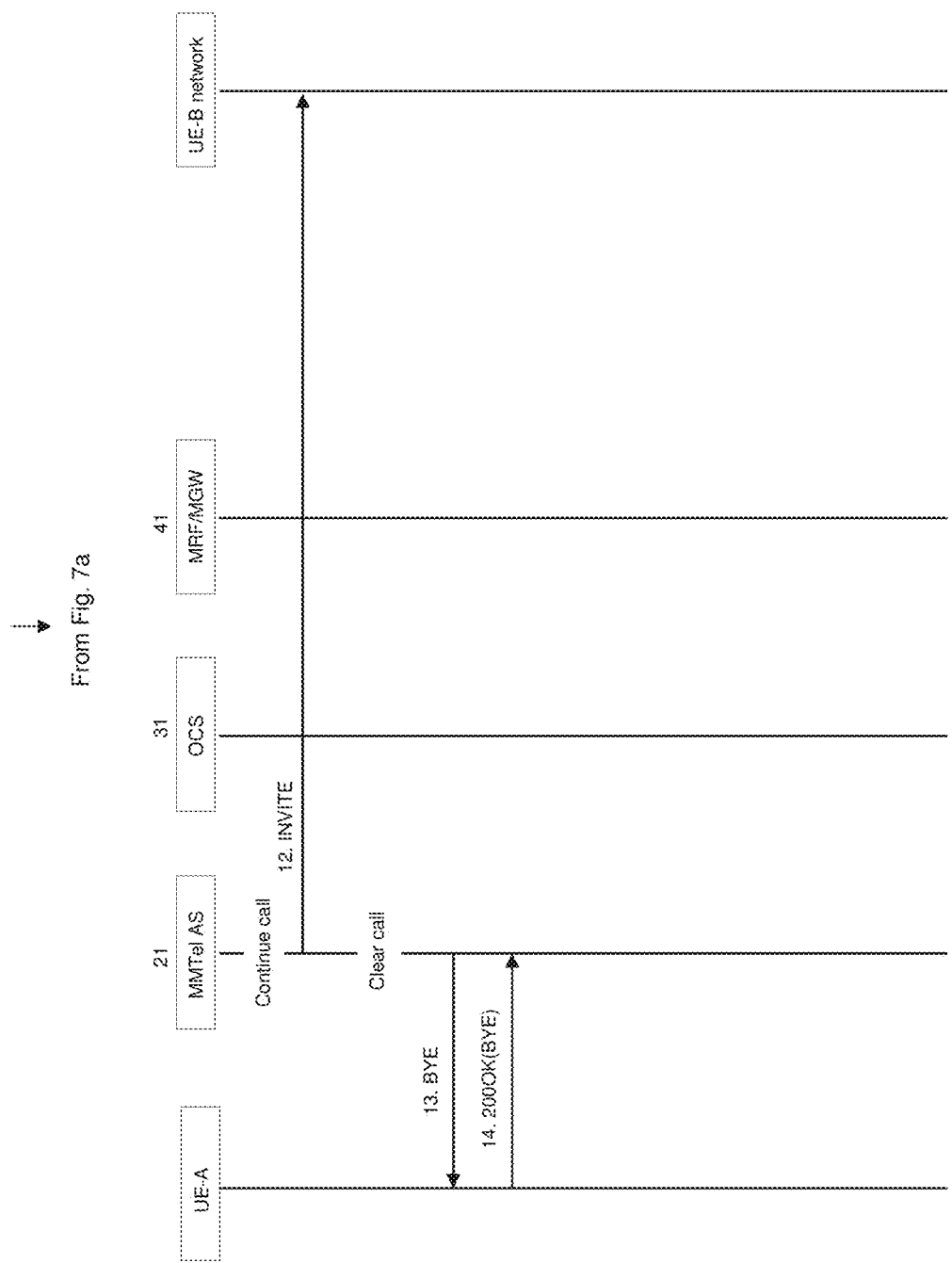

The example illustrated in FIGS. 7a and 7b describes an announcement request at call setup.

1. MMTel AS 21 receives an INVITE. The originating subscriber is an online charging user i.e. an address to OCS 31 is included in PCFA.
2. MMTel AS 21 collects the available charging information and sends an CCR(I) to the OCS 31.
3. OCS 31 will do a rating based on the received information and check account status. OCS 31 will have the knowledge that the subscriber is a prepaid user. If the Announcement service is possible to request from the AS, OCS 31 will check if some of the trigger conditions for the announcement service is fulfilled.

Trigger conditions in OCS 31 to request the Announcement service in the MMTel AS 21 can for example be:
  First call from a new subscriber
  First call after a refill
  Low balance i.e. a threshold for the account has been passed in OCS 31.
  No credit
  Account timer expiry
  Service supervision expiry 4. In addition to the normal interrogation result included in CCA(I), OCS 31 will also add an Announcement request. The Announcement request is carried in a new grouped AVP.
5. If an Announcement service is available and active in the MMTel AS 21, the result of the interrogation is stored and the Announcement service is started as the Timing indicator is set to immediate.
6. The MMTel AS 21 will select an announcement to send to the originating user. The selection is based on the announcement-identifier received from OCS 31.
7. A connection is established towards the originating user.
8. MMTel AS 21 will establish a connection to a Media Resource Function/Media Gateway (MRF/MGW) 41 and inform which announcement to play.
9. An announcement is played to the originating user. The MRF/MGW 41 indicates to the MMTel AS 21 when the announcement has been delivered.
10. The connection between the MMTal AS 21 and the MRF/MGW 41 is released.
11. MMTel AS 21 will continue the session based on the result from the interrogation i.e. either continue the call (step 12) or clear the call (steps 13 and 14).

Figure 8:
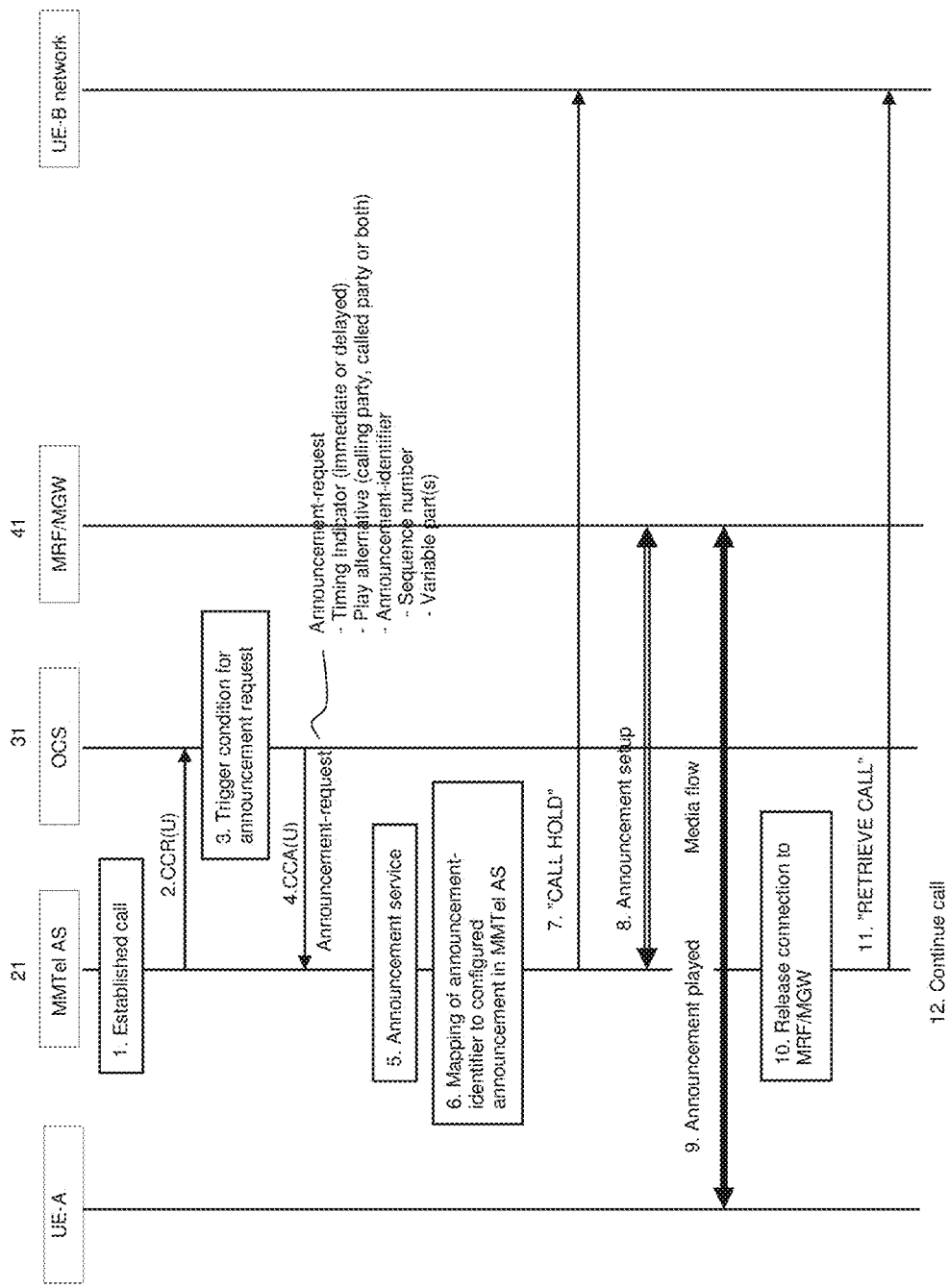
FIG. 8 shows a signaling diagram illustrating messages exchanged and steps performed in relation to the provision of an announcement service according to an embodiment of the present invention, where an announcement is provided during a call.

A further detailed example is illustrated in FIG. 8. It describes an announcement request during an established call.

1 A call is established in the MMTel AS 21.
2 The MMTel AS 21 must do a new interrogation towards the OCS 31. The reason can be that the earlier received quota has been used or that a rating condition has been changed e.g. a change of media. MMTel AS 21 collects the available charging information and sends a CCR(U) to the OCS 31.
3 OCS 31 will do a rating based on the received information and check account status. OCS 31 will have the knowledge that the subscriber is a prepaid user. If the Announcement service is possible to request from the AS, OCS 31 will check if some of the trigger conditions for the announcement service is fulfilled.
4 In addition to the normal interrogation result included in CCA(U), OCS 31 will also add an Announcement request. The Announcement request is carried in a new grouped AVP.
5 If an Announcement service is available and active in the MMTel AS 21, the result of the interrogation is stored and the Announcement service is started. It can be started immediately or delayed for a number of seconds based on the content of the Timing Indicator.
6 The MMTel AS 21 will select an announcement to send to the user. The selection is based on the announcement-identifier received from OCS 31.
7 MMTel AS 21 will establish connections based on the information contained in Play alternative indicator. In this example it is an announcement to the calling party. The MMTel AS 21 will place the connected party on hold.
8 MMTel AS 21 will establish a connection to a MRF/MGW 41 and inform which announcement to play.
9 An announcement is played to the user. The MRF/MGW 41 indicates to the MMTel AS 21 when the announcement has been delivered.
10 The connection between the MMTal AS 21 and the MRF/MGW 41 is released.
11 The connected party will be retrieved.
12 The call continues.

Figure 9:
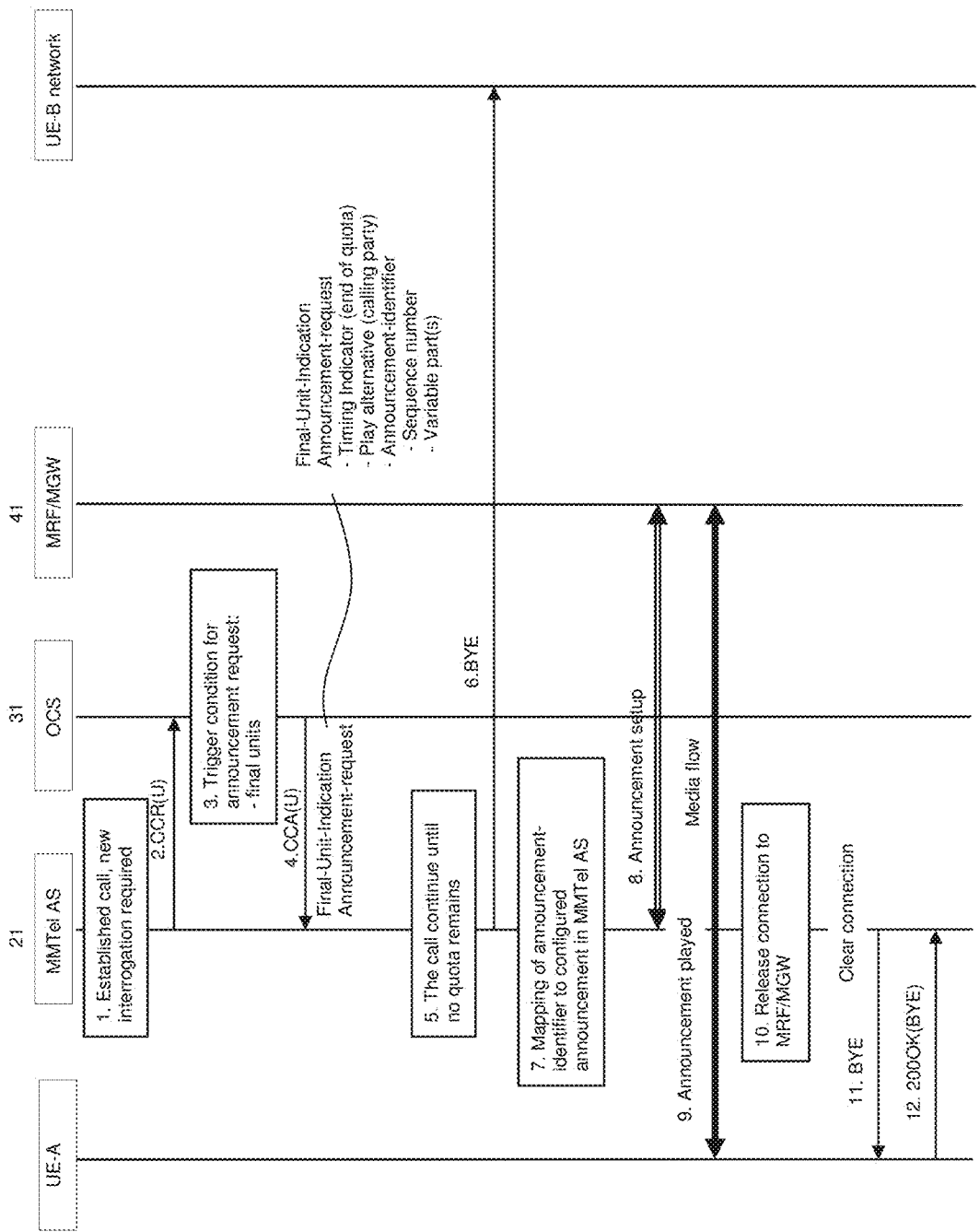
FIG. 9 shows a signaling diagram illustrating messages exchanged and steps performed in relation to the provision of an announcement service according to an embodiment of the present invention, where an announcement is provided at the end of a call.

A further detailed example is illustrated in FIG. 9. It shows an announcement request at the end of the call.

1 A call is established in the MMTel AS 21.
2 The MMTel AS 21 must do a new interrogation towards the OCS 31. The reason can be that the earlier received quota has been used or that a rating condition has been changed e.g. a change of media. MMTel AS 21 collects the available charging information and sends an CCR(U) to the OCS 31.

3 OCS 31 will do a rating based on the received information and check account status. OCS 31 will have the knowledge that the subscriber is a prepaid user. If the Announcement service is possible to request from the AS, OCS 31 will check if some of the trigger conditions for the announcement service is fulfilled. In this case the final units from the account will be used.

4 In addition to the normal interrogation result included in CCA(U), OCS 31 will also add an Announcement request. The Announcement request is carried in a new grouped AVP.

5 If an Announcement service is available and active in the MMTel AS 21, the result of the interrogation is stored and the Announcement service is started. For this case the timing indicator is used to inform that the message shall be played first after the received quota has been used. The default for the timing indicator is otherwise "immediate".

6 When all quota has been used the MMTel AS 21 disconnects the connected party by sending a BYE.

7 The MMTel AS 21 will select an announcement to send to the user. The selection is based on the announcement-identifier received from OCS 31.

8 MMTel AS 21 will establish a connection to a MRF/MGW 41 and inform which announcement to play.

9 An announcement is played to the user. The MRF/MGW 41 indicates to the MMTel AS 21 when the announcement has been delivered.

10 The connection between the MMTal AS 21 and the MRF/MGW 41 is released.

11-12 The call is cleared.

Figure 10:
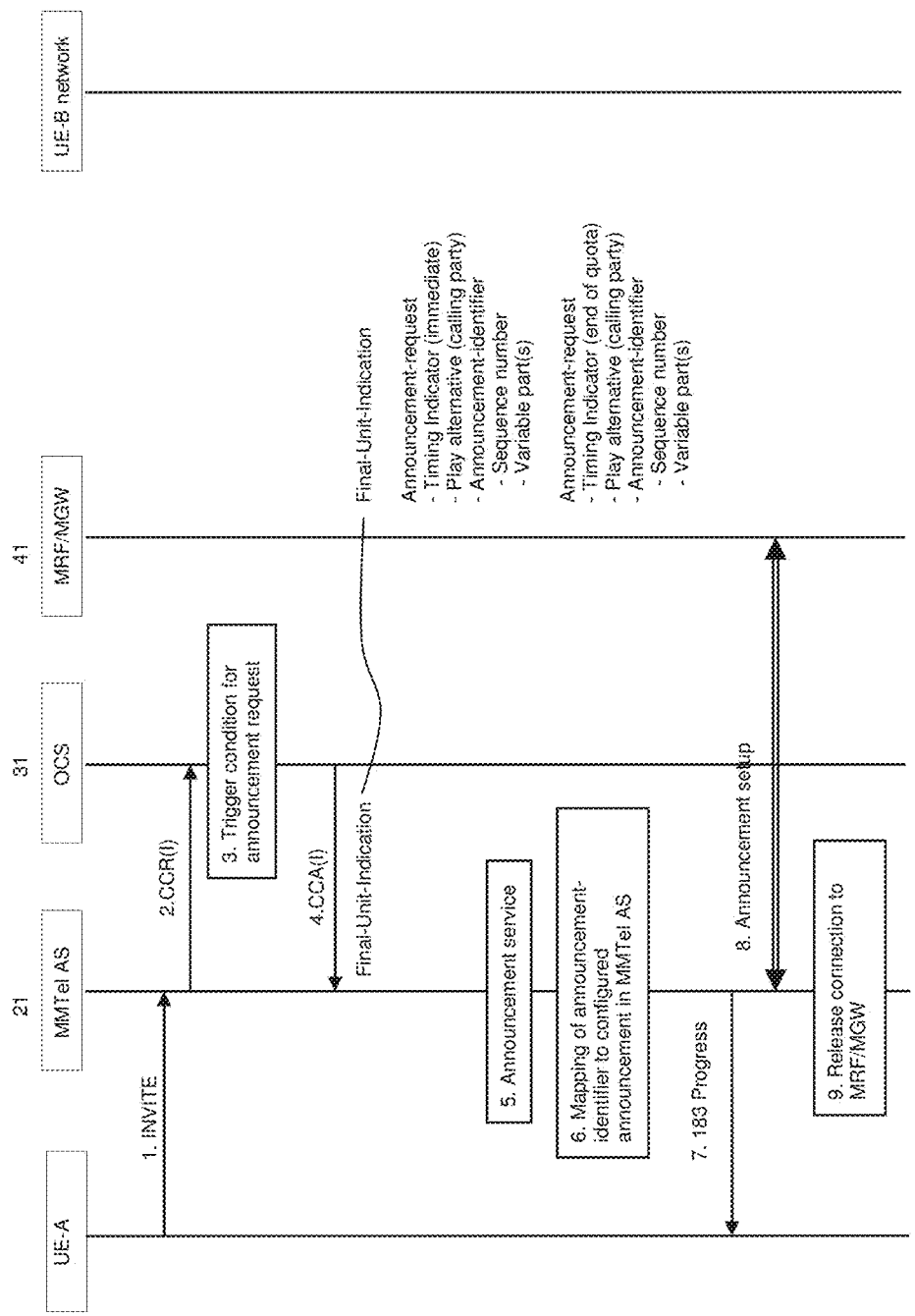
FIG. 10 shows a signaling diagram illustrating messages exchanged and steps performed in relation to the provision of an announcement service according to an embodiment of the present invention, where an announcement is provided both at call setup and at the end of a call.

An example of multiple announcements is illustrated in FIG. 10. It describes the case when the account is very low i.e. in the first interrogation towards the OCS 31 the final units on the account will be used. In this case the CCA(I) will include two announcement-requests: one for a call setup announcement and one for the announcement at the end of the call.

Figure 11:
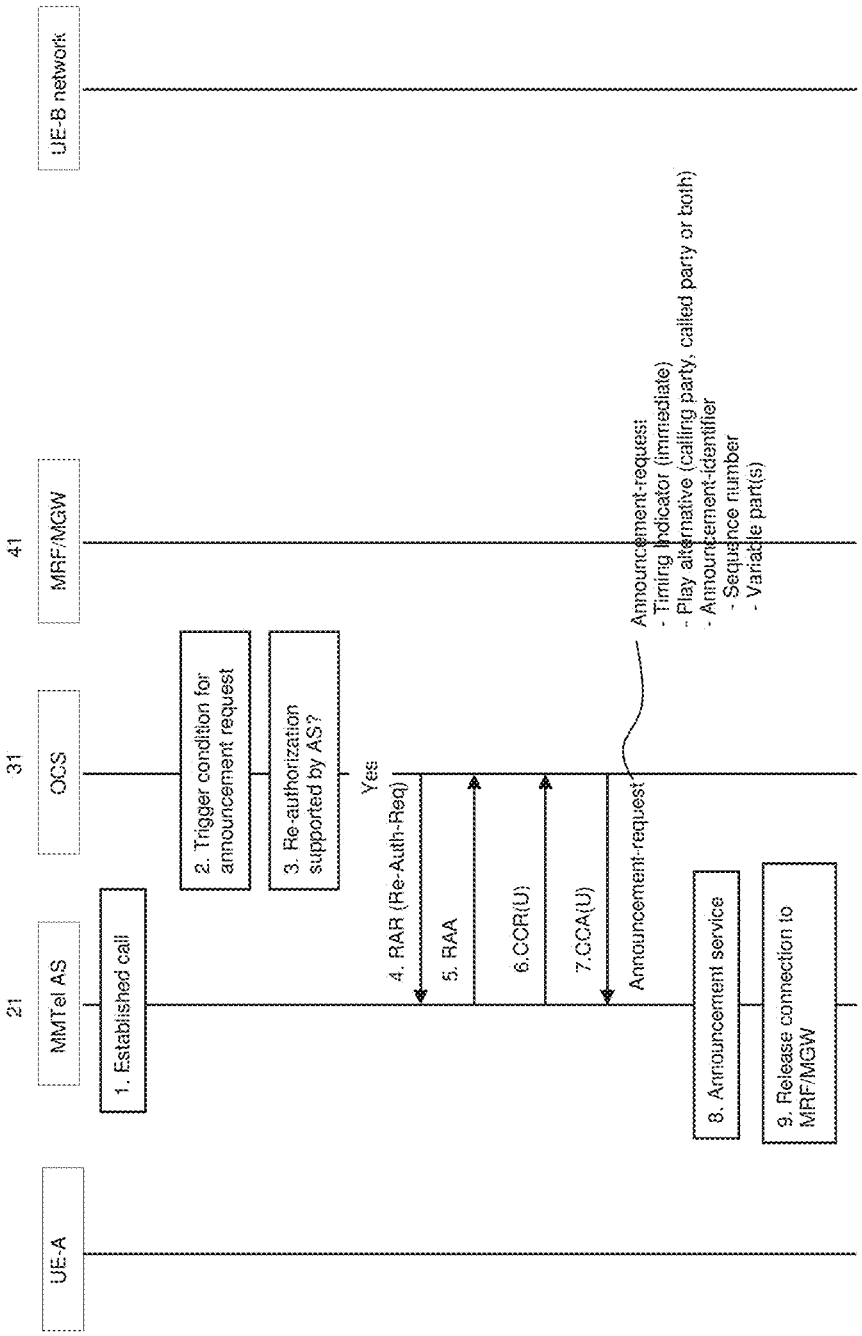
FIG. 11 shows a signaling diagram illustrating messages exchanged and steps performed in relation to the provision of an announcement service according to an embodiment of the present invention, where an announcement is provided during a call and initiated from the online charging system.

As illustrated in FIG. 11, if a trigger for an urgent announcement in the OCS 31 indicates that an announcement should be played immediately, the OCS 31 can send a Re-Auth-Request (RAR) towards the MMTel AS 21 and force the MMTel AS 21 to do a new interrogation. At processing of this interrogation, the OCS 31 can add the Announcement-request to the interrogation result. This corresponds to "Option A" described above with reference to FIGS. 4a and 4b, while the other examples described above with reference to FIGS. 7 to 10 correspond to "Option B".

Figure 12:
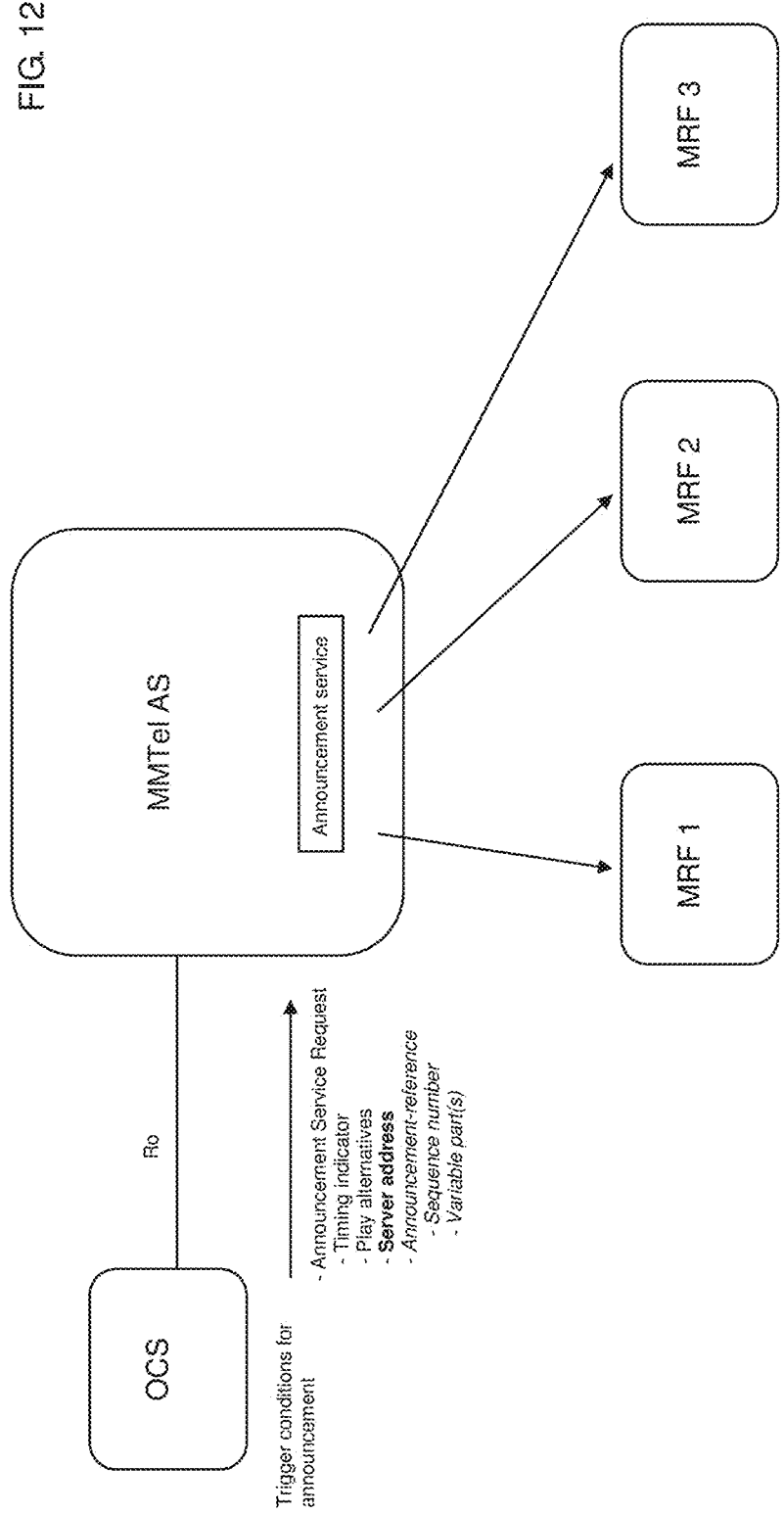
FIGS. 12 and 13 are for use in explaining a first alternative embodying the present invention.

A first alternative, in which selection of an announcement server (e.g. Media Resource Function or MRF) is done in the OCS, is illustrated in FIG. 12. To enhance the possibility to create a more network optimized solution as well as decrease the coupling of announcement-identifiers between OCS and the MMTel AS, the OCS can provide to the MMTel AS an address of an announcement server, as part of the Announcement service request.

Instead of doing the mapping in the MMTel AS for the announcement, the defined structure of the announcement by OCS is transferred to the announcement server when the MMTel AS establish the connection. The configuration for announcements requested from OCS is coordinated between the OCS and the announcement server instead of between OCS and MMTel AS.

For this alternative the Announcement-Identifier is replaced with an Announcement-Reference. The sequence number as well as the variable parts is still applicable. This information is transferred from MMTel AS to the announcement equipment.

Figure 13:
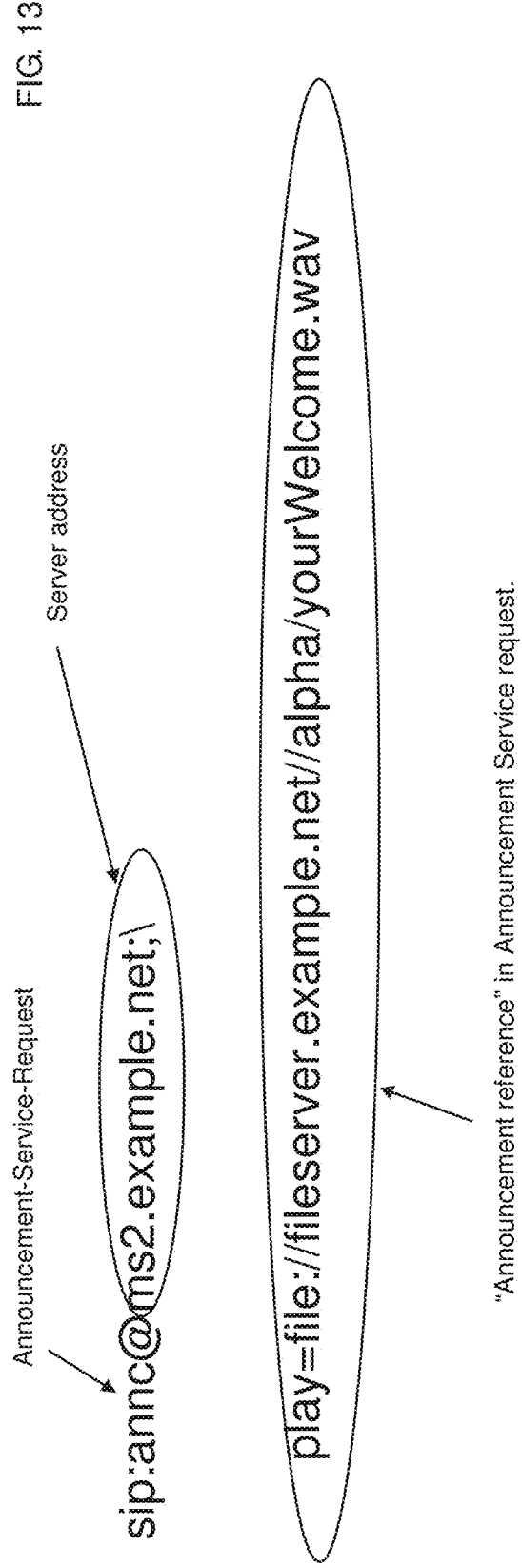

To communicate the information to the announcement server from OCS and MMtel AS the principles from RFC 4240 (Basic Network Media Services with SIP) can be used. An example is provided in FIG. 13. The req-URI is used in the communication from MMTel AS to the announcement server.

Figure 14:
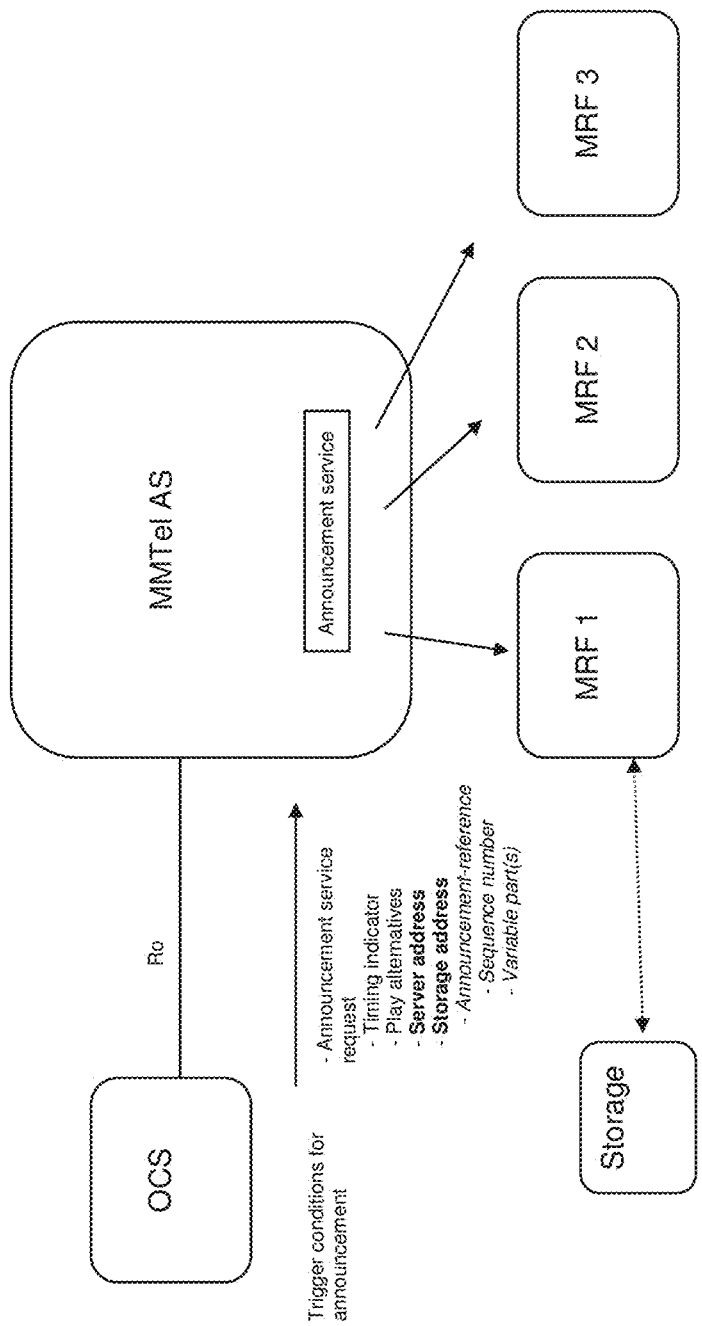
FIG. 14 is for use in explaining a second alternative embodying the present invention.

A second alternative, in which selection of announcement server as well as announcement storage is done in OCS, is illustrated in FIG. 14. To further enhance the possibility to create a more network optimized solution as well as decrease the coupling of announcement-identifiers between OCS and the announcement server, the OCS can provide the address to the announcement server to the MMTel AS, as part of the announcement service request and an address to the storage of the announcement. This is useful if the announcement server supports VXML. The announcement server can fetch the indicated VXML from the storage by using http.

The announcement storage can be centralized in the network or it can be placed within the OCS. To supply the VXML in the storage with values for the variable parts (if any) this information can be provided between the OCS and the storage or the information can be included in the signaling from OCS to MMTel AS and further to the announcement server.

To communicate the information to the announcement server from OCS and MMtel AS the principle from RFC 4240 can be used.

Figure 15:
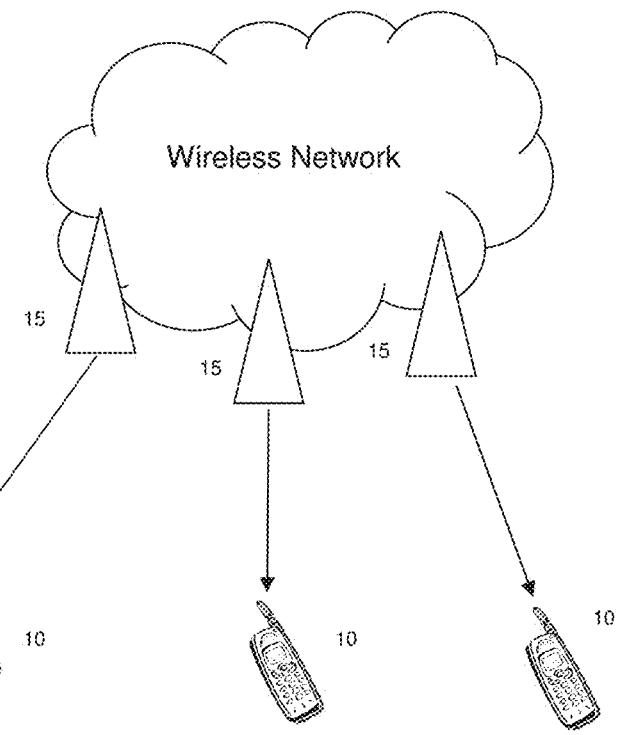
FIG. 15 illustrates schematically a network in which an embodiment of the present invention can be implemented.

Although the described solutions may be implemented in any appropriate type of telecommunication system supporting any suitable communication standards and using any suitable components, particular embodiments of the described solutions may be implemented in an LTE network, such as that illustrated in FIG. 15.

As shown in FIG. 15, the example network may include one or more instances of user equipment (UEs) 10 and one or more base stations 15 capable of communicating with these UEs 10, along with any additional elements suitable to support communication between UEs 10 or between a UE 10 and another communication device (such as a landline telephone). Although the illustrated UEs 10 may represent communication devices that include any suitable combination of hardware and/or software, these UEs 10 may, in particular embodiments, represent devices such as the example UE 10 illustrated in greater detail by FIG. 16. Similarly, although the illustrated base stations 15 may represent network nodes that include any suitable combination of hardware and/or software, these base stations 15 may, in particular embodiments, represent devices such as the example base station 15 illustrated in greater detail by FIG. 17.

Figure 16:
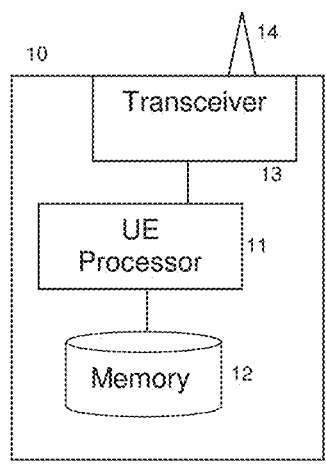
FIG. 16 illustrates schematically a user terminal according to an embodiment of the present invention.

As shown in FIG. 16, the example UE 10 includes a processor 11, a memory 12, a transceiver 13, and an antenna 14. In particular embodiments, some or all of the functionality described above as being provided by mobile communication devices or other forms of UE may be provided by the UE processor 11 executing instructions stored on a computer-readable medium, such as the memory 12 shown in FIG. 16. Alternative embodiments of the UE 10 may include additional components beyond those shown in FIG. 16 that may be responsible for providing certain aspects of the UE's functionality, including any of the functionality described above and/or any functionality necessary to support the solution described above.

Figure 17:
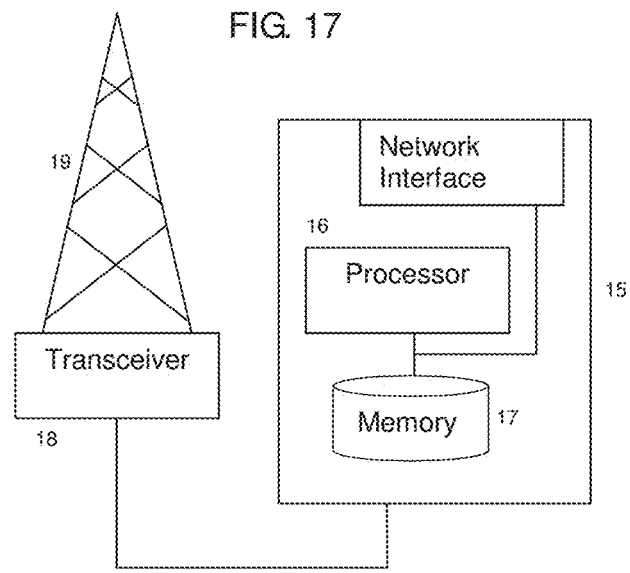
FIG. 17 illustrates schematically a base station according to an embodiment of the present invention.

As shown in FIG. 17, the example base station 15 includes a processor 16, a memory 17, a transceiver 18, and an antenna 19. In particular embodiments, some or all of the functionality described above as being provided by a mobile base station, a base station controller, a node B, an enhanced node B, and/or any other type of mobile communications node may be provided by the base station processor 16 executing instructions stored on a computer-readable medium, such as the memory shown in FIG. 17. Alternative embodiments of the base station may include additional components responsible for providing additional functionality, including any of the functionality identified above and/or any functionality necessary to support the solution described above.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present disclosure. For example, it will be readily appreciated that although the above embodiments are described with reference to parts of a 3GPP core network, the technique described herein will also be applicable to like networks, such as a successor of the 3GPP core network, having like functional components. The term User Equipment (UE) is also used in place of the term mobile terminal or mobile phone. The term UE is familiar in the 3rd Generation Partnership Project (3GPP) documentation, and is intended to refer to any piece of equipment that is configured to access the internet; it would include, for example and without limitation, mobile telecommunication devices, portable or handheld computing devices and desktop or installed computers. Therefore, terms such as 3GPP and UE and associated or related terms used in the above description and in the appended drawings are to be interpreted accordingly.

What is claimed is:

1. A method relating to online charging within an IP Multimedia Subsystem (IMS), the method comprising, at an IMS charging node:
    receiving a credit control request message from an IMS service network node over a service charging interface provided between the IMS service node and the IMS charging node;
    determining with reference to one or more triggering conditions that an announcement is to be provided to a user associated with the credit control request message or another user, or both; and,
    following such a determination, initiating an announcement service in the IMS service node by sending an announcement request in a credit control answer message over the service charging interface to the IMS service node, the credit control answer message being in response to the credit control request message, and the announcement request comprising an announcement identifier of the announcement to be provided.

2. The method of claim 1, wherein said determining is performed in response to receipt of the credit control request message.

3. The method of claim 1, further comprising, in response to such a determination in the determining step, requesting the IMS service node to send the credit control request message, such that said receiving is performed following said determining.

4. The method of claim 3, wherein said requesting comprises sending a re-authorization request.

5. The method of claim 1, wherein the announcement request comprises at least one of:
    information concerning when the announcement is to be provided; and
    information concerning who the announcement is to be provided to.

6. The method of claim 1, wherein the announcement request comprises an address of a server to be used by the IMS service node for looking up predetermined content based on the announcement identifier, and wherein the method further comprises communicating with the server to determine the predetermined content for the announcement.

7. The method of claim 1, wherein the method further comprises looking up predetermined content using the announcement identifier.

8. The method of claim 1, wherein the content of the announcement comprises at least one of a welcome message, account balance information, barring-related information, account balance information, information relating to a potential or actual call cut off.

9. The method of claim 1, wherein the announcement request specifies whether the announcement is to be provided immediately or whether it is to be delayed for a predetermined time or until a predetermined event.

10. The method of claim 1, wherein the announcement is an account-related announcement or a credit-related announcement.

11. The method of claim 1, wherein the user associated with the credit control request message is a calling party, the other user is a called party, and the IMS service node is involved in enabling a call from the calling party to the called party.

12. The method of claim 1, wherein a plurality of announcement requests is included in the credit control answer message.

13. The method of claim 1, wherein the credit control answer message is a Diameter Credit Control Answer (CCA) message and the credit control request message is a Diameter Credit Control Request (CCR) message.

14. The method of claim 1, wherein the IMS charging node comprises an Online Charging System (OCS).

15. The method of claim 1, wherein the IMS service node comprises an Application Server.

16. The method of claim 1, wherein the service charging interface is a Diameter Ro interface.

17. A method relating to online charging within an IP Multimedia Subsystem (IMS), the method comprising, at an IMS service node:
    sending a credit control request message to an IMS charging node over a service charging interface provided between the IMS service node and the IMS charging node;
    following a determination at the IMS charging node that an announcement is to be provided to a user associated with the credit control request message or another user, or both, receiving an announcement request in a credit control answer message over the service charging interface, the credit control answer message being in response to the credit control request message and the announcement request comprising an announcement identifier of the announcement to be provided;

in response to receipt of the announcement request, activating an announcement service in the IMS service node; and, as part of the announcement service, arranging for an announcement to be provided based on the announcement identifier.

18. The method of claim 17, wherein the announcement request comprises at least one of:

information concerning when the announcement is to be provided; and information concerning who the announcement is to be provided to.

19. The method of claim 17 wherein the announcement request comprises an address of a server to be used by the IMS service node for looking up predetermined content based on the announcement identifier, and wherein the method further comprises communicating with the server to determine the predetermined content for the announcement.

20. The method of claim 17, wherein the method further comprises looking up predetermined content using the announcement identifier.

21. The method of claim 17, wherein a plurality of announcement requests is included in the credit control answer message.

22. The method of claim 17, wherein the credit control answer message is a Diameter Credit Control Answer (CCA) message and the credit control request message is a Diameter Credit Control Request (CCR) message.

23. The method of claim 17, wherein the IMS charging node comprises an Online Charging System (OCS) and wherein the IMS service node comprises an Application Server.

24. An apparatus for online charging within an IP Multimedia Subsystem (IMS), the apparatus comprising:

an input/output interface adapted to receive a credit control request message from an IMS service network node over a service charging interface provided between the IMS service node and the IMS charging node; and a processing circuit configured to determine with reference to one or more triggering conditions that an announcement is to be provided to a user associated with the credit control request message or another user, or both, and, following such a determination, initiate an announcement service in the IMS service node by sending an announcement request in a credit control answer message over the service charging interface to the IMS service node, the credit control answer message being in response to the credit control request message, and the announcement request comprising an announcement identifier of the announcement to be provided.

25. An apparatus for online charging within an IP Multimedia Subsystem (IMS), the apparatus comprising an input/output interface, and a processing circuit adapted to:

send a credit control request message to an IMS charging node over a service charging interface provided between the IMS service node and the IMS charging node;

following a determination at the IMS charging node that an announcement is to be provided to a user associated with the credit control request message or another user, or both, receive an announcement request in a credit control answer message over the service charging interface, the credit control answer message being in response to the credit control request message and the announcement request comprising an announcement identifier of the announcement to be provided;

in response to receipt of the announcement request, activate an announcement service in the IMS service node; and, as part of the announcement service, arrange for an announcement to be provided based on the announcement identifier.

\* \* \* \* \*